(12) United States Patent
Martin et al.

(10) Patent No.: US 8,625,457 B2
(45) Date of Patent: Jan. 7, 2014

(54) METHOD AND APPARATUS FOR CONCURRENT TOPOLOGY DISCOVERY

(75) Inventors: Daniel Joseph Martin, Pawling, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 11/949,167

(22) Filed: Dec. 3, 2007

(65) Prior Publication Data

US 2009/0141659 A1 Jun. 4, 2009

(51) Int. Cl.
*H04L 12/28* (2006.01)
*H04L 12/24* (2006.01)

(52) U.S. Cl.
CPC ............ *H04L 41/12* (2013.01); *H04L 41/0213* (2013.01); *H04L 41/04* (2013.01); *H04L 41/046* (2013.01); *H04L 41/0893* (2013.01)
USPC ............ 370/254; 370/255; 709/223; 709/224

(58) Field of Classification Search
CPC ....................................................... H04L 41/12
USPC ............................ 370/254, 255; 709/223, 224
See application file for complete search history.

(56) References Cited

U.S. PATENT DOCUMENTS

| | | | | |
|---|---|---|---|---|
| 5,185,860 | A * | 2/1993 | Wu ................................ | 709/224 |
| 5,850,397 | A * | 12/1998 | Raab et al. ..................... | 370/392 |
| 5,974,237 | A | 10/1999 | Shurmer et al. ............... | 709/224 |
| 6,173,325 | B1 | 1/2001 | Kukreja ........................ | 709/224 |
| 6,639,900 | B1 | 10/2003 | Anstey et al. | |
| 6,883,024 | B2 * | 4/2005 | Ullmann ....................... | 709/220 |
| 7,082,134 | B1 * | 7/2006 | Lim et al. ...................... | 370/392 |
| 7,139,824 | B2 | 11/2006 | Grech et al. ................... | 709/224 |
| 7,206,861 | B1 * | 4/2007 | Callon .......................... | 709/242 |
| 2002/0078237 | A1 | 6/2002 | Leighton et al. .............. | 709/239 |

(Continued)

FOREIGN PATENT DOCUMENTS

| | | |
|---|---|---|
| GB | 2404644 A | 3/2005 |
| JP | H04229742 A | 8/1992 |
| JP | H0993265 A | 4/1997 |
| JP | 2004282272 A | 10/2004 |
| WO | WO2008016861 A2 | 2/2008 |

OTHER PUBLICATIONS

International Search Report for Application No. GB0818191.9 dated Oct. 29, 2008.
Li, Yuzhao, Changxing Pei, Changhua Zhu and Jiandong Li "An Algorithm for Discovering Physical Topology in Single Subnet IP Networks," *Proceedings of the 19th International Conference on Advanced Information Networking and Applications (AINA '05)* IEEE, 2005.

*Primary Examiner* — Ayaz Sheikh
*Assistant Examiner* — Tarell Hampton
(74) *Attorney, Agent, or Firm* — Terrile, Cannatti, Chambers & Holland, LLP; Stephen A. Terrile

(57) ABSTRACT

A method, system and computer-usable medium for discovering the topology of a network by using multiple discovery agents operating in parallel. A NodeList containing information about known nodes in a target network is received. The number ('K') of discovery agents to be used is determined, where 1<=K<=TotalNumberOfNodes). The nodes are partitioned into node groups, each of which has a group identifier respectively assigning it to a discovery agent 'M' where 1<=M<=K. A GraphList is created to hold information about known and discovered nodes. Each entry in the NodeList list is processed by its assigned discovery agent 'M', which sends probe messages to the target node to determine the node identifiers of discovered neighboring nodes.

14 Claims, 5 Drawing Sheets

(56) References Cited

U.S. PATENT DOCUMENTS

| | | |
|---|---|---|
| 2004/0260745 A1 | 12/2004 | Gage et al. ............... 709/200 |
| 2005/0086344 A1* | 4/2005 | Suesserman ............... 709/227 |
| 2005/0128944 A1* | 6/2005 | Zhang et al. ............... 370/229 |
| 2006/0015632 A1* | 1/2006 | Tiemann et al. ............ 709/230 |
| 2006/0182034 A1 | 8/2006 | Klinker et al. ............. 370/238 |
| 2007/0100940 A1* | 5/2007 | Eriksson .................... 709/204 |
| 2008/0181134 A1 | 7/2008 | Anerousis et al. |

* cited by examiner

METHOD AND APPARATUS FOR CONCURRENT TOPOLOGY DISCOVERY

BACKGROUND OF THE INVENTION

1. Field of the Invention

Embodiments of the disclosure relate in general to the field of computers and similar technologies, and in particular to software utilized in this field. Still more particularly, it relates to discovering the topology of a network.

2. Description of the Related Art

The growth of the Internet, combined with the recent popularity of applications such as streaming video, streaming audio, and large aggregations of voice over Internet protocol (VOIP) traffic, has resulted in a growing demand for network bandwidth and availability. To meet these demands, additional switches, bridges, and hubs are being deployed in ever-increasing numbers. As a result, the amount of network infrastructure to be managed will continue to grow. The effective management of network elements requires accurate and up-to-date knowledge of the network's topology, which is a representation of its nodes and their connections to each other. Knowledge of the topology of a network's elements is generally a prerequisite for many network management tasks, including reactive and proactive resource management, performance evaluation and optimization, flow control, event correlation, and root cause analysis of service faults. However, discovering information about the topology of a network more challenging as the size of the network grows.

Approaches to discovering a network's topology include the use of a discovery agent that performs a graph traversal of the network's elements, collecting information about each node in a network and its connections to other nodes. The discovery process begins with the agent being provided a set of known nodes in the network. With probes, such as simple network management protocol (SNMP) queries, or by reading routing table information, the agent discovers links flowing outward from the known portions of the graph. The agent then finds the nodes that belong to the other side of that link. The process continues until no more links remain to be explored.

There are two key performance indicators of the discovery process, the first being the time it takes to discover the network and the second being the number of probe messages that are sent to the network nodes. The most efficient discovery process would send only one probe message per node. With a single discovery agent, the time taken to discover the network is the sum of the response time for each probe message. In a large network of thousands, or tens of thousands, of network nodes, such a graph traversal can consume a significant amount of time. The time required to perform the graph traversal can be reduced if multiple agents can operate in parallel to discover and traverse the graph in parallel. However, such parallel discovery may result in sending multiple probe messages to each of the different nodes. As a result, unless properly coordinated, multiple node discovery agents working in parallel would not result in a reduction of the time spent to discover the network's topology.

BRIEF SUMMARY OF THE INVENTION

The present invention includes, but is not limited to, a method, system and computer-usable medium for discovering the topology of a network with a network node discovery manager using multiple node discovery agents operating in parallel. In various embodiments, a network node discovery manager obtains a NodeList containing the unique node identifier of each known node in a target network. The number ('K') of node discovery agents to be used in parallel to discover the topology of the target network is then determined. Any number of node discovery agents can be chosen, from a single node discovery agent up to the total number of known nodes (i.e., 1<=K<=TotalNumberOfNodes). A GraphList of network nodes is created by the node discovery manager to hold node information about both known and discovered nodes, and is initially assigned to be empty.

Hash operations are performed on the unique node identifiers in the NodeList to partition the known nodes into the same number of node groups as the number ('K') of node discovery agents. The generated hash values associated with each node group are then appended to their corresponding unique node identifiers in the NodeList. The hash value associated with node groups are then respectively assigned to a node discovery agent 'M' where 1<=M<=K. A node information receipt thread for the GraphList is initiated by the node discovery manager, followed by the initiation of a node discovery thread for each of the node discovery agents 'M'. An unprocessed node identifier entry is then popped from the NodeList and its corresponding node group hash value is determined. If the node discovery agent 'M' assigned to the node group hash value is busy, then the process is repeated until a node identifier entry is popped that corresponds to an available node discovery agent 'M'.

The node discovery agent 'M' then sends probe messages, such as SNMP queries, to the target known node. If the probe determines that the target node is connected to neighboring nodes, then information about connections to the neighboring nodes is collected. In one embodiment, the connections are physical connections. In another embodiment, the connections are logical. In yet another embodiment, the connections may be a combination of physical or logical connections. The collected node and connection information is processed to determine the unique node identifier of discovered neighboring nodes. If the unique node identifiers of the discovered neighboring nodes are not currently listed in the NodeList, then hash operations are performed on their unique node identifiers. The resulting group node hash values are then used to assign the discovered neighboring nodes to a node for processing by its corresponding node discovery agent 'M'. If the connections between the target and the discovered neighboring node nodes are not currently listed in the GraphList, then they are added. The process is continued until all 'K' node discovery agents 'M' have completed their node discovery operations on known and discovered neighboring node nodes. Once all node information is collected by the 'K' node discovery agents 'M' and listed in the GraphList, a network topology is generated. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
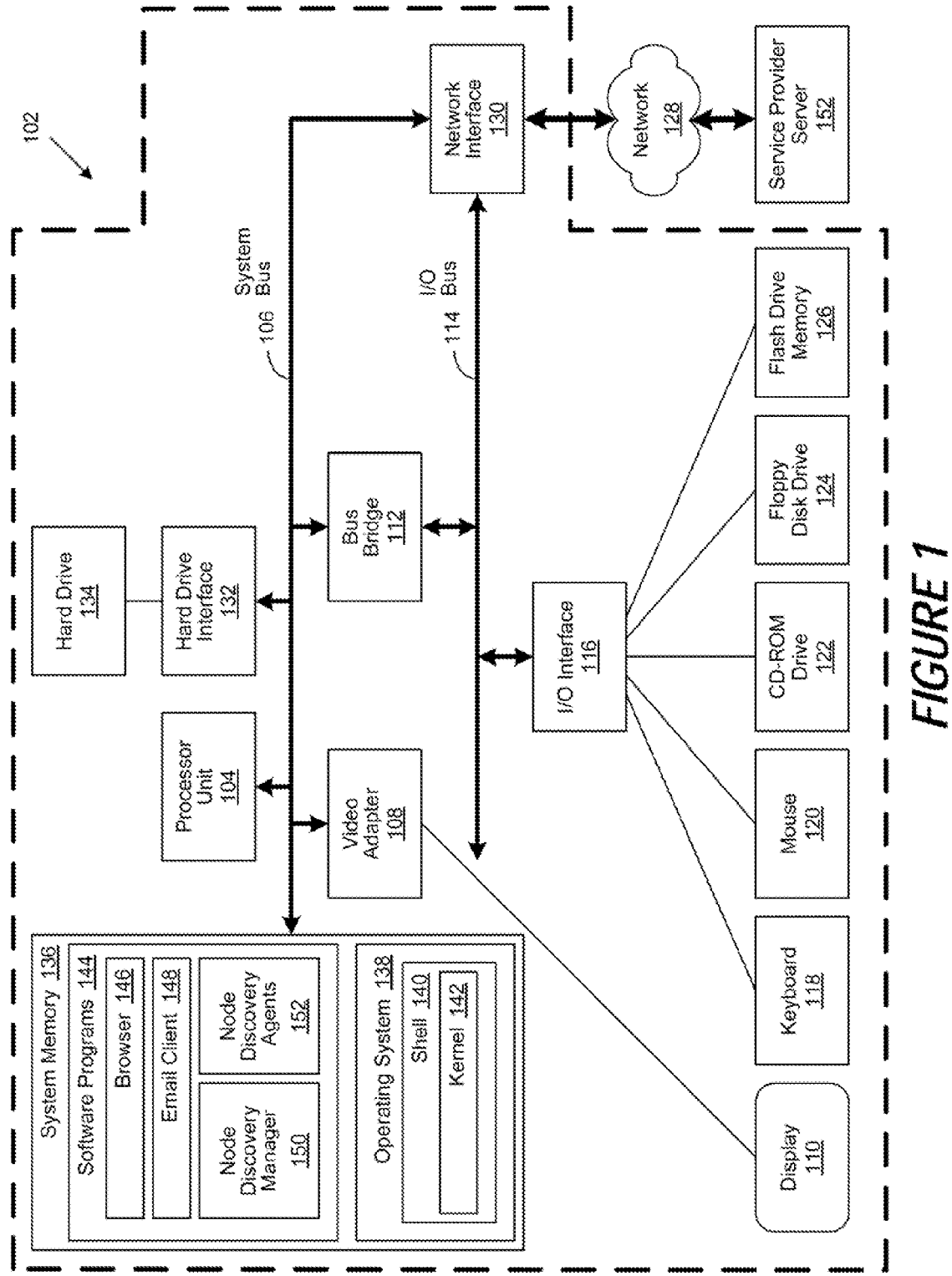
FIG. 1 depicts an exemplary client computer in which the present invention may be implemented.

A method, system and computer-usable medium are disclosed for discovering the topology of a network with a network node discovery manager using multiple node discovery agents operating in parallel. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++, or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy, and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a node discovery manager 150 and one or more node discovery agents 152. The node discovery manager 150 and the one or more node discovery agents 152 include code for implementing the processes described in FIGS. 2 through 3 described herein below. In one embodiment, client computer 102 is able to download the node discovery manager 150 and the one or more node discovery agents 152 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
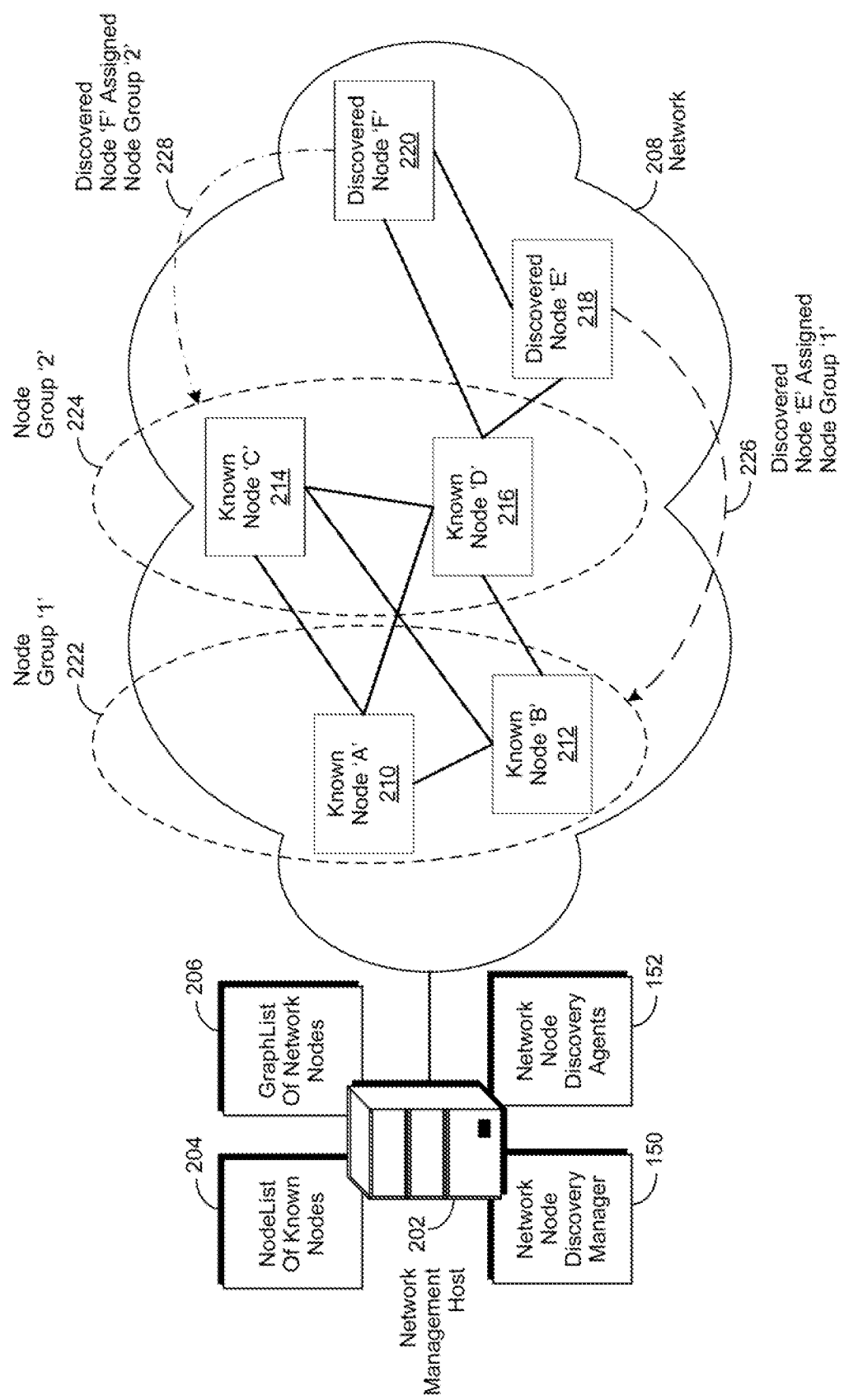
FIG. 2 is a simplified block diagram of a network node discovery manager using network node discovery agents operating in parallel to discover the topology of a network.

FIG. 2 is a simplified block diagram of a network node discovery manager using network node discovery agents operating in parallel to discover the topology of a network. In various embodiments, a network management host 202 comprises a network node discovery manager 150 and one or more network node discovery agents 152. Network node discovery operations are begun with the network node discovery manager 150 obtaining a NodeList 204 that contains node information about the known network nodes of target network 208. The node information contained in the NodeList 204 includes the unique node identifier of each known node 'A' 210, 'B' 212, 'C' 214, and 'D' 216 of the network 208.

The number ('K') of node discovery agents 152 to be used in discovering the topology of the target network 208 is determined by the node discovery manager 150. Any number of node discovery agents can be chosen, from a single node discovery agent up to the total number of known nodes (i.e., 1<=K<=TotalNumberOfNodes). It will be appreciated that a single node discovery agent may be inadequate for discovering the topology of a network comprising thousands of nodes. Conversely, using an individual node discovery agent for each of the thousands of nodes would likely represent an unreasonable processing overhead burden on the network management host 202. A GraphList of network nodes 206 is created by the node discovery manager 150 to hold node information about both known and discovered nodes, and is initially assigned to be empty.

Hash operations are performed on the unique node identifiers in the NodeList 204 to partition the known nodes 'A' 210, 'B' 212, 'C' 214, and 'D' 216 into the same number of node groups as the number ('K') of node discovery agents 152. As an example, hash operations performed on the unique node identifiers of known nodes 'A' 210 and 'B' 212 result in the group hash value assigned to node group '1' 222. Similarly, hash operations performed on the unique node identifiers of known nodes 'C' 214 and 'D' 216 result in the node group hash value assigned to node group '2' 224. The generated hash values associated with node groups '1' 222 and '2' 224 are then appended to their corresponding unique node identifiers in the NodeList 204. The hash values associated with node groups '1' 222 and '2' 224 are then respectively assigned to a node discovery agent 'M' 152, where 1<=M<=K. Once the node group hash values are respectively assigned to each node discovery agent 'M' 152, parallel operation of the 'K' number of node discovery agents 152 is initiated by the network node discovery manager 150. A node information receipt thread for the GraphList 206 is initiated by the node discovery manager 150, followed by the initiation of a node discovery thread for each of the node discovery agents 'M' 152.

An unprocessed node identifier is then popped from the NodeList 204 and its corresponding node group hash value is determined. If it is determined that the node discovery agent 'M' 152 assigned to the node group hash value is busy, then the process is repeated until a node identifier entry is popped that corresponds to a node discovery agent 'M' 152 that is not busy. Once a node identifier entry is popped that has a node group hash value corresponding to a node discovery agent 'M' 152 that is not busy, the target known node 'A' 210, 'B' 212, 'C' 214, 'D' 216 is assigned to its corresponding node discovery agent 'M' 152 for processing. The node discovery agent 'M' 152 then sends probe messages, such as SNMP queries and other methods familiar to those of skill in the art, to the target known node 'A' 210, 'B' 212, 'C' 214, and 'D' 216.

A determination is then made whether the known target node 'A' 210, 'B' 212, 'C' 214, and 'D' 216 is connected to one or more unknown neighboring nodes 'E' 218, 'F' 220. If it is determined that the target node 'A' 210, 'B' 212, 'C' 214, 'D' 216 is connected to neighboring nodes 'E' 218, 'F' 220, then the probe collects node information from the target node 'A' 210, 'B' 212, 'C' 214, 'D' 216, including information about connections to neighboring nodes E' 218, 'F' 220. In one embodiment, the connections are physical connections. In another embodiment, the connections are logical. In yet another embodiment, the connections may be a combination of physical or logical connections. The collected node information is processed to determine unique node identifier of discovered neighboring nodes E' 218 and 'F' 220.

As an example, the node discovery agent 'M' 152 assigned to node group '2' 224 probes known node 'D' 216 for connections to neighboring nodes. The collected node information indicates that known node 'D' 216 is connected to known nodes 'A' 210, 'B' 212, 'C' 214 as well as unknown, or discovered, nodes E' 218 and 'F' 220. A determination is then made whether the unique node identifiers of the discovered neighboring nodes E' 218 and 'F' 220 are currently listed in the NodeList 204. If they are not, then hash operations described in greater detail herein are performed on their respective unique node identifiers to generate a hash value that can be used to assign the discovered neighboring nodes E' 218 and 'F' 220 for processing to a designated node discovery agent 'M' 152. As an example, the hash value of discovered neighboring node 'E' 218 signifies that it be assigned 226 to the node group '1' 222. Similarly, the hash value of discovered neighboring node 'F' 220 signifies that it be assigned 228 to the node group '1' 224. A determination is then made whether one or more connections between the target node 'A' 210. 'B' 212, 'C' 214, 'D' 216 and discovered neighboring node nodes E' 218, 'F' 220 are listed in the GraphList 206. If they are not, then they are added to the GraphList 206. The process is continued until all 'K' node discovery agents 'M' 152 have completed their node discovery operations on known nodes 'A' 210, 'B' 212, 'C' 214, 'D' 216 and discovered neighboring node nodes E' 218, 'F' 220. Once all node information is listed in the GraphList 206, a network topology is generated and network node discovery operations are ended.

Figure 3A:
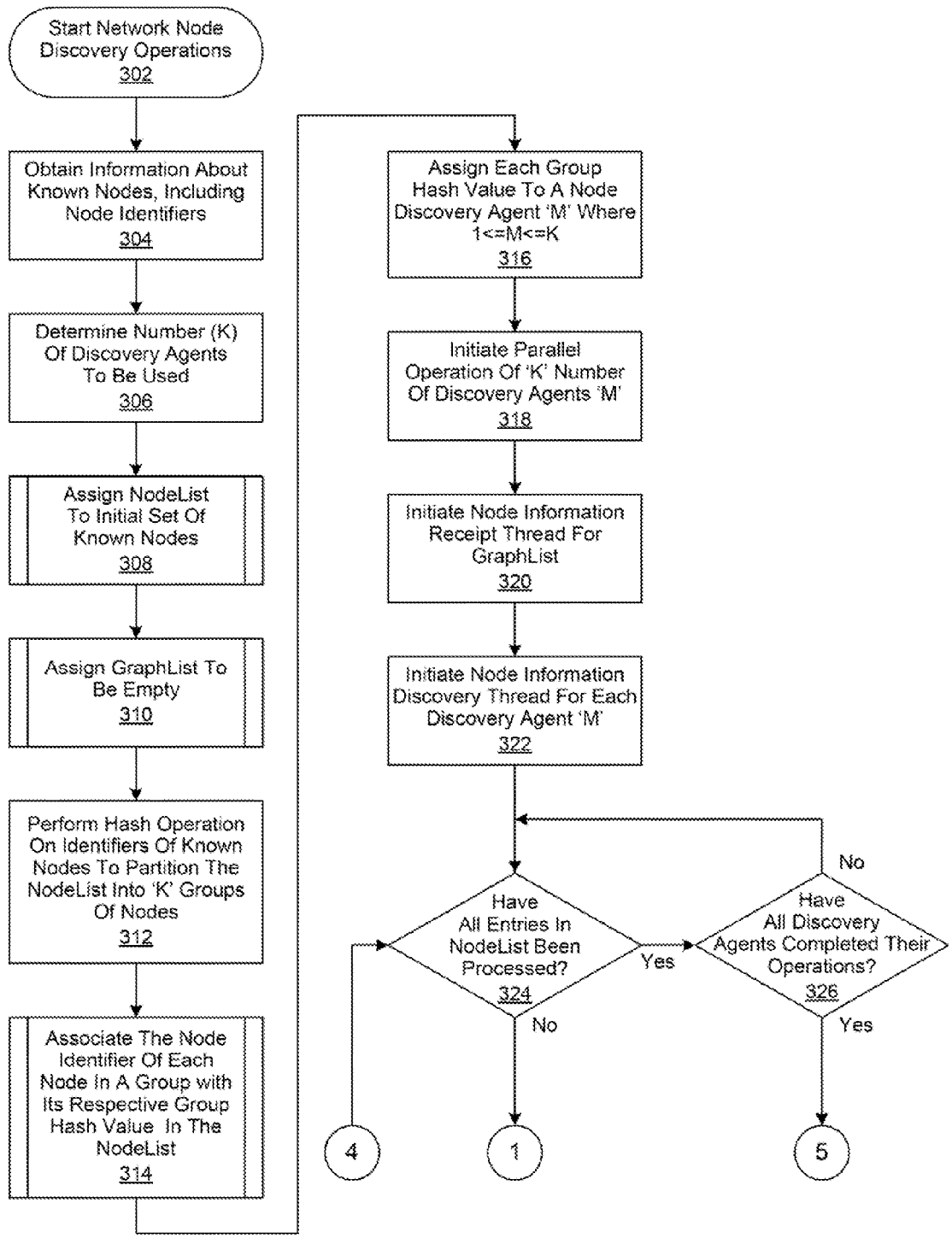
FIG. 3 is a flowchart of the operation of a network node discovery manager using network node discovery agents operating in parallel to discover the topology of a network.
Figure 3B:
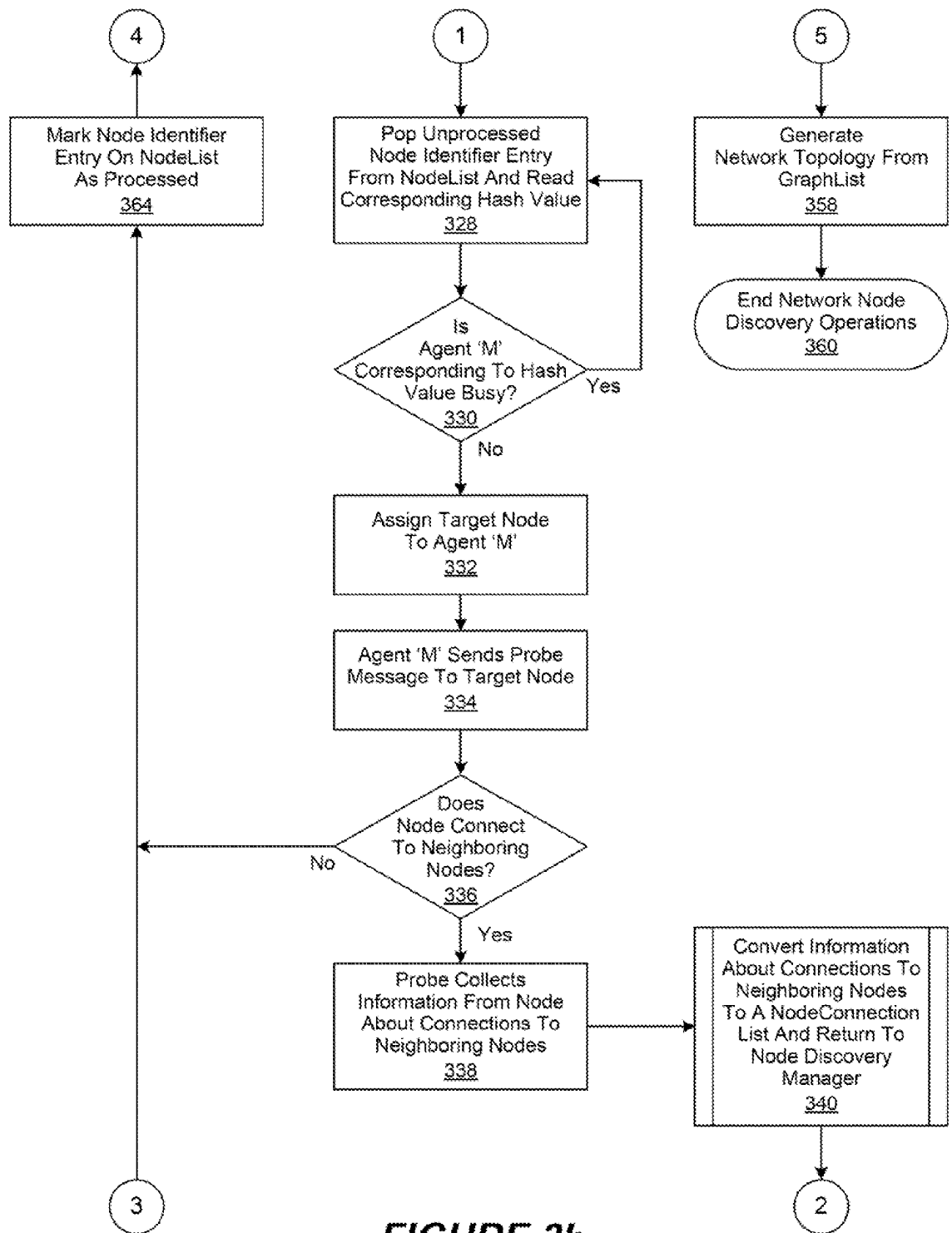
Figure 3C:
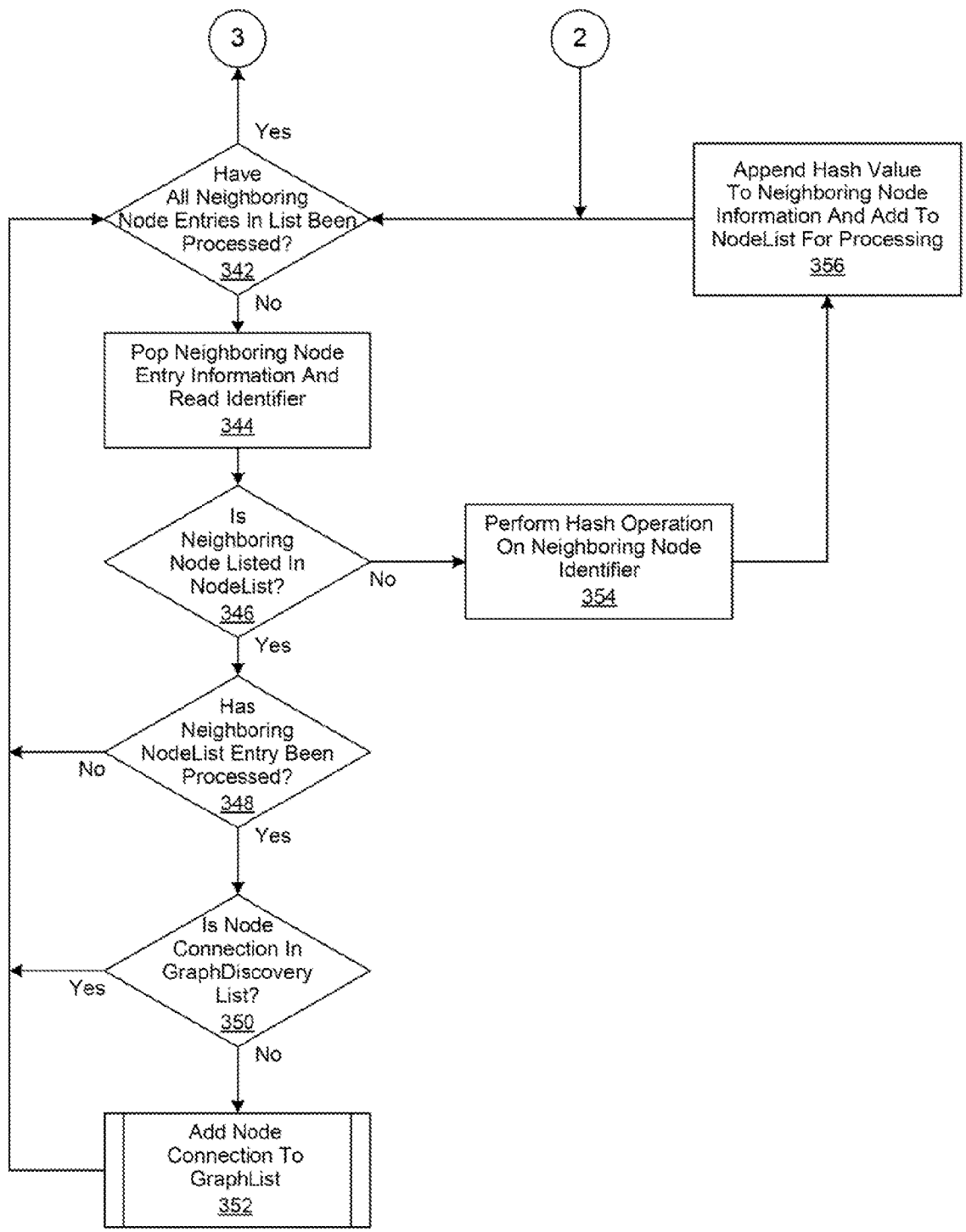

FIG. 3 is a flowchart of a network node discovery manager using network node discovery agents operating in parallel to discover the topology of a network. In one embodiment of the invention, network node discovery operations are begun in step 302. In step 304, information about the target network is obtained by a network node discovery manager, including the unique node identifier of each known node in the network. The number ('K') of node discovery agents to be used in discovering the topology of the target network is then determined in step 306 by the node discovery manager. For example, any number of node discovery agents can be chosen, from a single node discovery agent up to the total number of known nodes (i.e., I<=K<=TotalNumberOfNodes). It will be appreciated that a single node discovery agent may be insufficient for discovering the topology of a network comprising thousands of nodes. Conversely, using an individual node discovery agent for each of the thousands of nodes would likely represent an unreasonable processing overhead burden on a network management server.

The initial set of known nodes, along with their associated unique node identifiers, is then assigned by the node discovery manager to a NodeList in step 308. A GraphList, which will hold node information about both known and discovered nodes, is created in step 310 by the node discovery manager and assigned to be initially empty. Hash operations are then performed in step 312 on the unique node identifiers in the NodeList to partition the known nodes into the same number of node groups as the number ('K') of node discovery agents. Each of the generated hash values is then associated with its respective unique node identifier in the NodeList in step 314. The hash value associated with each group of nodes is then assigned in step 316 to a node discovery agent 'M', where I<=M<=K. Once the group hash values are assigned to each node discovery agent 'M', parallel operation of the 'K' number of node discovery agents is initiated in step 318. In step 320, a node information receipt thread for the GraphList is initiated by the node discovery manager, followed by the initiation of a node discovery thread for each of the node discovery agents 'M' in step 322.

A determination is then made in step 324 whether all entries in the NodeList have been processed. If they have, then a determination is made in step 326 whether all 'K' node discovery agents have completed their topology discovery operations. If they have not, then an unprocessed node identifier is popped from the NodeList in step 328 and its corresponding node group hash value is determined. A determination is then made in step 330 whether the node discovery agent 'M' assigned to the node group hash value is busy. If it is, then the process is repeated, beginning with step 328, until a node identifier entry is popped that corresponds to a node discovery agent 'M' that is not busy. Once it is determined in step 328 that the popped node identifier entry has a node group hash value corresponding to a node discovery agent 'M' that is not busy, the target node is assigned to the node discovery agent 'M' for processing. The node discovery agent 'M' then sends probe messages, such as SNMP queries and other methods familiar to those of skill in the art, to the target node in step 334.

A determination is then made in step 336 whether the target node is connected to one or more neighboring nodes. If it is determined in step 336 that the node is an endpoint of the network, or that it is not connected to any other node, then the node identifier is marked in step 364 a processed node in the NodeList. The process is then repeated, beginning with step 324, where a determination is made whether all entries in the NodeList have been processed. However, if it is determined in step 336 that the target node is connected to neighboring nodes, then the probe collects node information from the node, including information about connections to neighboring nodes. In one embodiment, the connections are physical connections. In another embodiment, the connections are logical. In yet another embodiment, the connections may be a combination of physical or logical connections. The collected node information is then converted to a NodeConnection list in step 340 and the NodeConnection list is then returned to the node discovery manager.

A determination is then made in step 342 whether all node connection entries in the NodeConnection list have been processed. If it is determined in step 342 that they have not, then a neighboring node entry is popped in step 344 and its unique node identifier is determined in step 344. A determination is then made in step 346 whether the unique node identifier is currently listed in the NodeList. If it is, then a determination is then made in step 348 whether the neighboring node has been processed.

It will be apparent to skilled practitioners of the art that a discovered neighboring node represented as an entry in the NodeList will have a corresponding node group hash value assigning it for processing by a predetermined node discovery agent 'M'. Regardless of whether node discovery agent 'M' is the current agent or another agent, the node entry has not yet been popped in step 328 or assigned to a node discovery agent 'M' in step 332. As such, no further processing operations are necessary at this point in the process, as they will be performed once the neighboring node entry is popped, beginning with step 328. Accordingly, if it is determined in step 348 that the neighboring node has not been processed, then the process is repeated, beginning with step 342.

However, if it is determined in step 348 that the neighboring node entry in the NodeList has been marked as processed, then a determination is made in step 350 whether the one or more connections between the target and neighboring node, whether physical or logical, are listed in the GraphList. It will be appreciated that even if the target node and the neighboring node have both been previously processed, it is possible for a new connection to be established since the time they were processed. Such a new connection would alter the topology of the network and adversely affect its accuracy. Accordingly, if it is determined in step 350 that one or more connections between the target and neighboring node are not listed in the GraphList, then they are added to the GraphList in step 352. Otherwise, the process is repeated, beginning with step 342.

If it is determined in step 346 that the unique node identifier of the neighboring node is not currently listed in the NodeList, then a hash operation is performed on its unique node identifier in step 354. As described in detail herein, the hash operation will generate a hash value that will be used to associate the discovered neighboring node with an existing node group. It will be apparent, by extension, that the node group hash value will also assign the discovered neighboring node to a predetermined node discovery agent 'M' for processing. Accordingly, the hash value is added to the unique node identifier of the neighboring node and it is entered as an entry in the NodeList for subsequent processing in step 356.

As described hereinabove, the corresponding node group bash value representing a discovered neighboring node in the NodeList will result in it being assigned for processing by a predetermined node discovery agent 'M'. As a result, no further node connection processing operations are necessary at this point in the process as they will be performed once the neighboring node entry is popped, beginning with step 328. The process is then repeated, beginning with step 342. Once it has been determined in step 326 that all node discovery agents 'M' have completed their respective node discovery operations, then a network topology is generated in step 358 from the node information contained in the GraphyDiscovery list. Network node discovery operations are then ended in step 360 once the network topology is generated in step 358.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps. operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for discovering the topology of a network, comprising:

receiving a first list of node entries, each of the node entries comprising a unique node identifier representing a known node;

performing operations on the unique node identifier of the node entries to partition the node entries into a plurality of node groups;

assigning a first node discovery agent to a first group of nodes and a second node discovery agent to a second group of nodes, the first and second node discovery agents operable to collect node information from a node;

collecting node information from a first node, the node information collected by the first node discovery agent and describing a connection between the first node and a second node;

appending the node information to a second list of node entries; and processing the second list of node entries to generate a network topology;

determining if the node identifier of the second node is listed in the first list;

performing operations on the unique node identifier of the second node to determine its assignment to a node group if the node identifier of the second node is not listed in the first list;

appending the second node to the determined node group; and, collecting node information from the second node, the node information collected by the node discovery agent assigned to the determined node group and describing a connection between the second node and a third node; and wherein hash operations are performed on the unique node identifier to generate a hash value, the hash value operable to be used to partition the node entries into a plurality of node groups.

2. The method of claim 1, wherein the connection between the first node and a second node is physical.

3. The method of claim 1, wherein the connection between the first node and a second node is logical.

4. The method of claim 1, wherein a first connection between the first node and a second node is physical and a second connection is logical.

5. A system comprising:

a processor;

a data bus coupled to the processor; and a computer-usable medium embodying computer program code, the computer-usable medium being coupled to the data bus, the computer program code discovering the topology of a network and comprising instructions executable by the processor and configured for:

receiving a first list of node entries, each of the node entries comprising a unique node identifier representing a known node;

performing operations on the unique node identifier of the node entries to partition the node entries into a plurality of node groups;

assigning a first node discovery agent to a first group of nodes and a second node discovery agent to a second group of nodes, the first and second node discovery agents operable to collect node information from a node;

collecting node information from a first node, the node information collected by the first node discovery agent and describing a connection between the first node and a second node;

appending the node information to a second list of node entries;

processing the second list of node entries to generate a network topology;

determining if the node identifier of the second node is listed in the first list;

performing operations on the unique node identifier of the second node to determine its assignment to a node group if the node identifier of the second node is not listed in the first list;

appending the second node to the determined node group; and, collecting node information from the second node, the node information collected by the node discovery agent assigned to the determined node group and describing a connection between the second node and a third node; and wherein hash operations are performed on the unique node identifier to generate a hash value, the hash value operable to be used to partition the node entries into a plurality of node groups.

6. The system of claim 5, wherein the connection between the first node and a second node is physical.

7. The system of claim 5, wherein the connection between the first node and a second node is logical.

8. The system of claim 5, wherein a first connection between the first node and a second node is physical and a second connection is logical.

9. A non-transitory computer-usable medium embodying computer program code, the computer program code comprising computer executable instructions configured for:

receiving a first list of node entries, each of the node entries comprising a unique node identifier representing a known node;

performing operations on the unique node identifier of the node entries to partition the node entries into a plurality of node groups;

assigning a first node discovery agent to a first group of nodes and a second node discovery agent to a second group of nodes, the first and second node discovery agents operable to collect node information from a node;

collecting node information from a first node, the node information collected by the first node discovery agent and describing a connection between the first node and a second node;

appending the node information to a second list of node entries;

processing the second list of node entries to generate a network topology;

determining if the node identifier of the second node is listed in the first list;

performing operations on the unique node identifier of the second node to determine its assignment to a node group if the node identifier of the second node is not listed in the first list;

appending the second node to the determined node group; and, collecting node information from the second node, the node information collected by the node discovery agent assigned to the determined node group and describing a connection between the second node and a third node; and wherein hash operations are performed on the unique node identifier to generate a hash value, the hash value operable to be used to partition the node entries into a plurality of node groups.

10. The non-transitory computer usable medium of claim 9, wherein the connection between the first node and a second node is physical.

11. The non-transitory computer usable medium of claim 9, wherein the connection between the first node and a second node is logical.

12. The non-transitory computer usable medium of claim 9, wherein a first connection between the first node and a second node is physical and a second connection is logical.

13. The non-transitory computer usable medium of claim 9, wherein the computer executable instructions are deployable to a client computer from a server at a remote location.

14. The non-transitory computer usable medium of claim 9, wherein the computer executable instructions are provided by a service provider to a customer on an on-demand basis.

* * * * *